United States Patent
Koerner et al.

(10) Patent No.: US 10,207,809 B2
(45) Date of Patent: Feb. 19, 2019

(54) INTEGRATED AIR AND VAPOR CYCLE COOLING SYSTEM

(71) Applicant: HONEYWELL INTERNATIONAL INC., Morris Plains, NJ (US)

(72) Inventors: Mike Koerner, Rancho Palos Verdes, CA (US); Allen MacKnight, Signal Hill, CA (US); Siamak Nikbin, Marina Del Rey, CA (US); Myron Quan, Cerritos, CA (US); Daniel R Robles, Norwalk, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 140 days.

(21) Appl. No.: 14/991,155

(22) Filed: Jan. 8, 2016

(65) Prior Publication Data

US 2017/0057641 A1   Mar. 2, 2017

Related U.S. Application Data

(60) Provisional application No. 62/212,201, filed on Aug. 31, 2015.

(51) Int. Cl.
| | |
|---|---|
| *B64D 37/34* | (2006.01) |
| *B64D 13/06* | (2006.01) |
| *F25B 25/00* | (2006.01) |
| *B64D 13/08* | (2006.01) |

(52) U.S. Cl.
CPC .............. *B64D 13/06* (2013.01); *B64D 13/08* (2013.01); *B64D 37/34* (2013.01); *F25B 25/005* (2013.01); *B64D 2013/064* (2013.01); *B64D 2013/0618* (2013.01); *B64D 2013/0648* (2013.01)

(58) Field of Classification Search
CPC .. B64D 37/34; B64D 13/064; B64D 13/0648; B64D 13/08; F25B 25/005
See application file for complete search history.

(56) References Cited

U.S. PATENT DOCUMENTS

| | | | | |
|---|---|---|---|---|
| 2,767,561 | A | * 10/1956 | Seeger | B64D 13/06 417/406 |
| 3,082,609 | A | 3/1963 | Ryan et al. | |
| 3,158,197 | A | * 11/1964 | Blezard | B64D 13/00 165/104.31 |
| 4,505,124 | A | 3/1985 | Mayer | |
| 5,442,904 | A | * 8/1995 | Shnaid | F02C 6/18 60/39.183 |

(Continued)

OTHER PUBLICATIONS

Single Versus Multi-Stage Compressors—CASCO USA (Oct. 2014).*

(Continued)

*Primary Examiner* — Len Tran
*Assistant Examiner* — Jenna M Hopkins
(74) *Attorney, Agent, or Firm* — Shimokaji IP

(57) ABSTRACT

A cooling system in which an ACS (air cycle system) turbine may be driven by high pressure air from a turbo-fan engine and a VCS (vapor cycle system) having an evaporator and a VCS refrigerant compressor may be driven by the ACS turbine. Fluid of the chilled fluid reservoir, which may be chilled fuel, may be circulated through and cooled in the evaporator. In some embodiments, the ACS turbine may be coupled to the VCS refrigerant compressor by a magnetic coupling.

13 Claims, 2 Drawing Sheets

(56) References Cited

U.S. PATENT DOCUMENTS

| | | | |
|---|---|---|---|
| 5,899,085 A * | 5/1999 | Williams | B64D 13/06 62/236 |
| 6,182,435 B1 | 2/2001 | Niggemann et al. | |
| 6,415,595 B1 * | 7/2002 | Wilmot, Jr. | B64D 13/006 60/266 |
| 6,527,228 B2 | 3/2003 | Hisashi | |
| 6,629,428 B1 | 10/2003 | Murry | |
| 6,634,596 B2 | 10/2003 | Albero et al. | |
| 6,663,044 B1 | 12/2003 | Munoz et al. | |
| 6,776,002 B1 * | 8/2004 | Ho | B64D 13/06 62/401 |
| 6,908,062 B2 | 6/2005 | Munoz et al. | |
| 6,948,331 B1 * | 9/2005 | Ho | B64D 13/06 62/401 |
| 7,040,112 B2 * | 5/2006 | Axe | B64D 13/06 62/401 |
| 7,451,616 B2 * | 11/2008 | Ro | F04D 29/584 62/505 |
| 7,856,824 B2 * | 12/2010 | Anderson | B64D 13/08 60/226.1 |
| 8,019,522 B2 | 9/2011 | Coons | |
| 8,042,343 B2 | 10/2011 | Jaerlestaal | |
| 8,347,647 B2 * | 1/2013 | McAuliffe | B64D 13/06 62/401 |
| 8,424,339 B2 * | 4/2013 | Sommer | F25B 1/10 62/505 |
| 8,522,572 B2 * | 9/2013 | Coffinberry | B64D 13/06 165/235 |
| 8,863,544 B2 | 10/2014 | Lee et al. | |
| 8,926,182 B2 * | 1/2015 | Rosen | F16C 17/024 384/103 |
| 8,967,531 B2 | 3/2015 | Gagne et al. | |
| 8,978,359 B2 * | 3/2015 | Schlemmer-Kelling | F01N 3/106 123/562 |
| 9,500,198 B2 * | 11/2016 | Miazgowicz | F01D 5/06 |
| 9,581,089 B2 * | 2/2017 | Sarmiento Penuela | F02C 9/18 |
| 9,656,756 B2 * | 5/2017 | Atkey | B64D 13/08 |
| 9,669,936 B1 * | 6/2017 | Fiterman | B64D 13/06 |
| 2002/0162915 A1 * | 11/2002 | Mitani | B64D 13/06 244/118.5 |
| 2006/0083626 A1 * | 4/2006 | Manole | F04B 3/00 417/245 |
| 2006/0237583 A1 * | 10/2006 | Fucke | B64D 13/06 244/58 |
| 2006/0242985 A1 * | 11/2006 | Leck | B60H 1/3223 62/323.1 |
| 2008/0110193 A1 * | 5/2008 | Jonqueres | B64D 13/06 62/331 |
| 2010/0313591 A1 | 12/2010 | Lents et al. | |
| 2011/0005244 A1 * | 1/2011 | Finney | B64D 13/08 62/87 |
| 2012/0000205 A1 * | 1/2012 | Coffinberry | B64D 13/06 60/806 |
| 2012/0192578 A1 * | 8/2012 | Finney | B64D 13/06 62/87 |
| 2013/0086927 A1 * | 4/2013 | Mills | F25B 27/00 62/56 |
| 2013/0152615 A1 * | 6/2013 | Lee | H05K 7/207 62/241 |
| 2013/0187007 A1 * | 7/2013 | Mackin | F02C 6/08 244/134 R |
| 2013/0318983 A1 * | 12/2013 | Zhou | F02C 6/08 60/772 |
| 2014/0102125 A1 * | 4/2014 | Tinde | B64F 1/362 62/237 |
| 2015/0251766 A1 * | 9/2015 | Atkey | B64D 13/08 244/13 |

OTHER PUBLICATIONS

Pushing the Envelope A NASA Guide to Engines—NASA (Apr. 2007).*

Analytical Investigation of Multistage Turbine Efficiency Characteristics in Terms of Work and Speed Requirements—Stewart (1958).*

* cited by examiner

INTEGRATED AIR AND VAPOR CYCLE COOLING SYSTEM

RELATED APPLICATIONS

The present application claims benefit of U.S. Provisional Application No. 62/212,201 filed Aug. 31, 2015.

BACKGROUND OF THE INVENTION

The present invention generally relates to cooling systems, and more particularly to systems that include both air and vapor cycle cooling systems.

Future military aircraft will require greatly advanced capabilities in order to ensure air superiority, survival in heavily defended airspace, and success against a wide range of potential targets. These capabilities, including electronic attack and directed energy weapons, are expected to require as much as 10 times higher electric power levels than existing weapon systems.

While these power demands are significant, thermal management of these advanced systems will present an even greater challenge, due to low component efficiencies and waste heat quality. Low-observability requirements, such as limitations on ram air availability, composite aircraft skins which inhibit heat transfer, and higher efficiency engines with less fuel flow available for cooling, further compound this challenge.

Air cycle systems (ACS) offer the potential advantage of high pressure ratios and lift temperatures, and thus can be used with hotter heat sinks than comparable vapor cycle systems (VCS). However, ACS are much less efficient than VCS, resulting in higher power requirements and higher heat rejection demands.

On the other hand, VCS systems are more efficient, but require lower heat sink temperatures that are often not available without a dedicated ram air source, which still may be too hot to use during high speed flight.

Further, for the large thermal loads anticipated, the cooling system itself will require substantial power to drive it. The use of electric power would further tax the vehicle's electric power generation capability and the power conditioning, motor controllers, and motors needed would be relatively heavy, expensive, and unreliable. A direct mechanical drive may also be problematic as engines are not currently equipped for such high power take-off shaft loads, and incorporating such into new engine designs involves a number of design compromises including added weight, cost and mechanical complexity.

As can be seen, there is a need for an efficient cooling system that can be used in aircraft environments of the type described.

SUMMARY OF THE INVENTION

In one aspect of the invention, a cooling system comprises a turbo-compressor that includes a turbine that drives a hermetically sealed, two-stage compressor; wherein the turbine receives air from an engine; a condenser downstream of the turbo-compressor; wherein the condenser receives a discharge flow from the two-stage compressor and from the turbine; an evaporator downstream of the condenser; and wherein the evaporator is upstream of the two-stage compressor.

In another aspect of the invention, a cooling system comprises an air cycle system (ACS) turbine driven by high pressure air from a turbo-fan engine; a vapor cycle system (VCS) comprising an evaporator and a VCS compressor driven by the ACS turbine; a condenser cooled by discharge from the turbine; and a chilled fluid reservoir, wherein fluid of the chilled fluid reservoir is circulated through the evaporator.

In a further aspect of the invention, a cooling system comprises an air cycle system (ACS) turbine driven by air from a turbo-fan engine; a vapor cycle system (VCS) comprising a VCS refrigerant compressor driven by the ACS turbine; a condenser cooled by ACS turbine discharge; and an evaporator; wherein the ACS turbine is magnetically coupled to the VCS refrigerant compressor.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Generally, the present invention provides a hybrid air cycle system with a vapor cycle system by combining an ACS turbine and VCS compressor as part of a single turbo-compressor. A "simple-cycle" ACS, with cooled engine fan air expanded across the turbo-compressor turbine provides both shaft power to drive a vapor cycle compressor and a cool turbine discharge to use as the vapor cycle heat sink. The VSC includes the compressor driven by the turbine, which compresses a refrigerant gas; a condenser which rejects heat from the refrigerant gas to the turbine discharge thereby condensing the refrigerant gas; an expansion valve which reduces the pressure of a liquid refrigerant from the condenser; and an evaporator which absorbs heat from the thermal loads into the liquid refrigerant causing it to evaporate.

In the case of a variable-cycle engine, the present invention provides engine fan air that can be cooled by the engine's third stream, providing a high-pressure cool air source to drive the turbo-compressor. On conventional turbofan engines the fan air can be used to cool the engine bleed air.

However, at high fan air temperatures, a greater pressure ratio across the turbine can be required to bring the turbine discharge down to a low enough temperature to condense the VCS refrigerant. Alternately, aircraft fuel or a separate ram air source can be used as needed to further cool the bleed air.

The terms "directly" or "direct", in the context of two components of the system herein, is intended to mean that there is an absence of a third system component between the two components other than ducting to enable flow of a refrigerant or the like.

Figure 1:
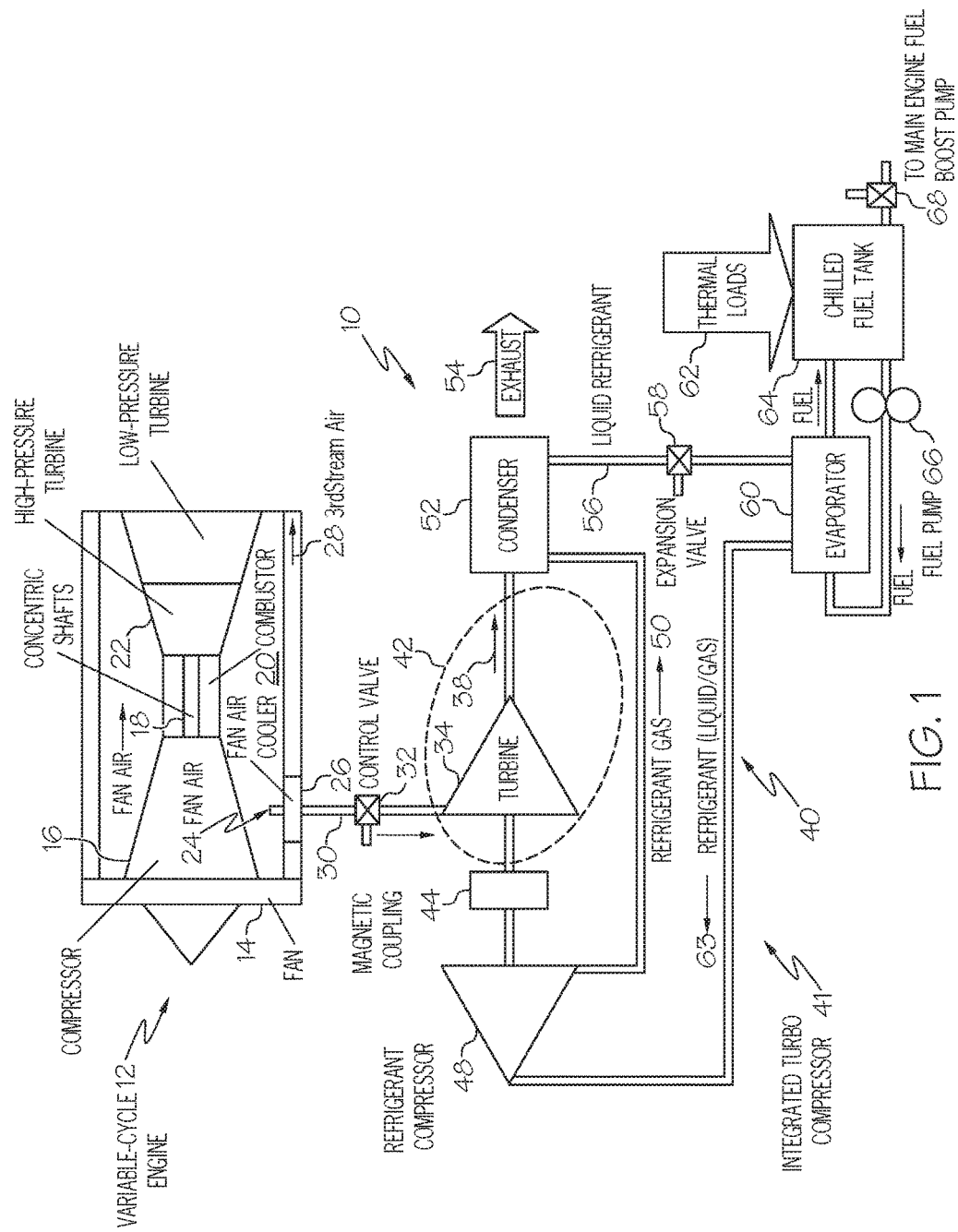
FIG. 1 is a simplified system schematic showing an example embodiment of the cooling system of the present invention.

With reference now to FIG. 1, embodiments of the present invention broadly provide a cooling system 10 that may include an air cycle system 42 and a vapor cycle system 40. In one embodiment, the cooling system 10 may be used with a variable-cycle engine 12 that may be a turbo-fan type jet aircraft engine having an inlet fan 14 and a compressor 16, which are connected by concentric shafts 18 to low- and high-pressure turbine sections 22. The compressor 16 and turbine sections 22 may be fluidically coupled by a combustion chamber 20.

Engine fan air 24 from the variable-cycle engine 12 may be directed through a heat exchanger 26, which may be a fan air cooler, or the like, where it may be cooled by a 3rd stream air flow 28. The 3rd stream air flow available in a variable-cycle engine 12 is well-known in the art as a means for contributing cooling capability for aircraft systems and engine components. The resulting high-pressure air 30, which may be now cooled to a moderate temperature, may be metered through a flow control valve 32 and into a turbine 34 of an integrated turbo-compressor 41, the turbine being integrated into the turbo-compressor configuration as described more fully below. The flow control valve 32 may be used to adjust the speed of the turbine 34 of the turbo-compressor, as needed, to accommodate variations in thermal loads, for instance, of aircraft, or other environment, in which the cooling system 10 may be installed. A cool discharge air stream 38 of the turbine 34 can provide a cool air stream 38 which may be used as a heat sink for the VCS 40, as described in greater detail below. The combination of engine fan air 24 cooled by 3rd stream air flow 28 and expanded across the turbine 34 to produce a cool discharge air stream 38 forms what is commonly referred to as a "simple-cycle" ACS 42.

Figure 2:
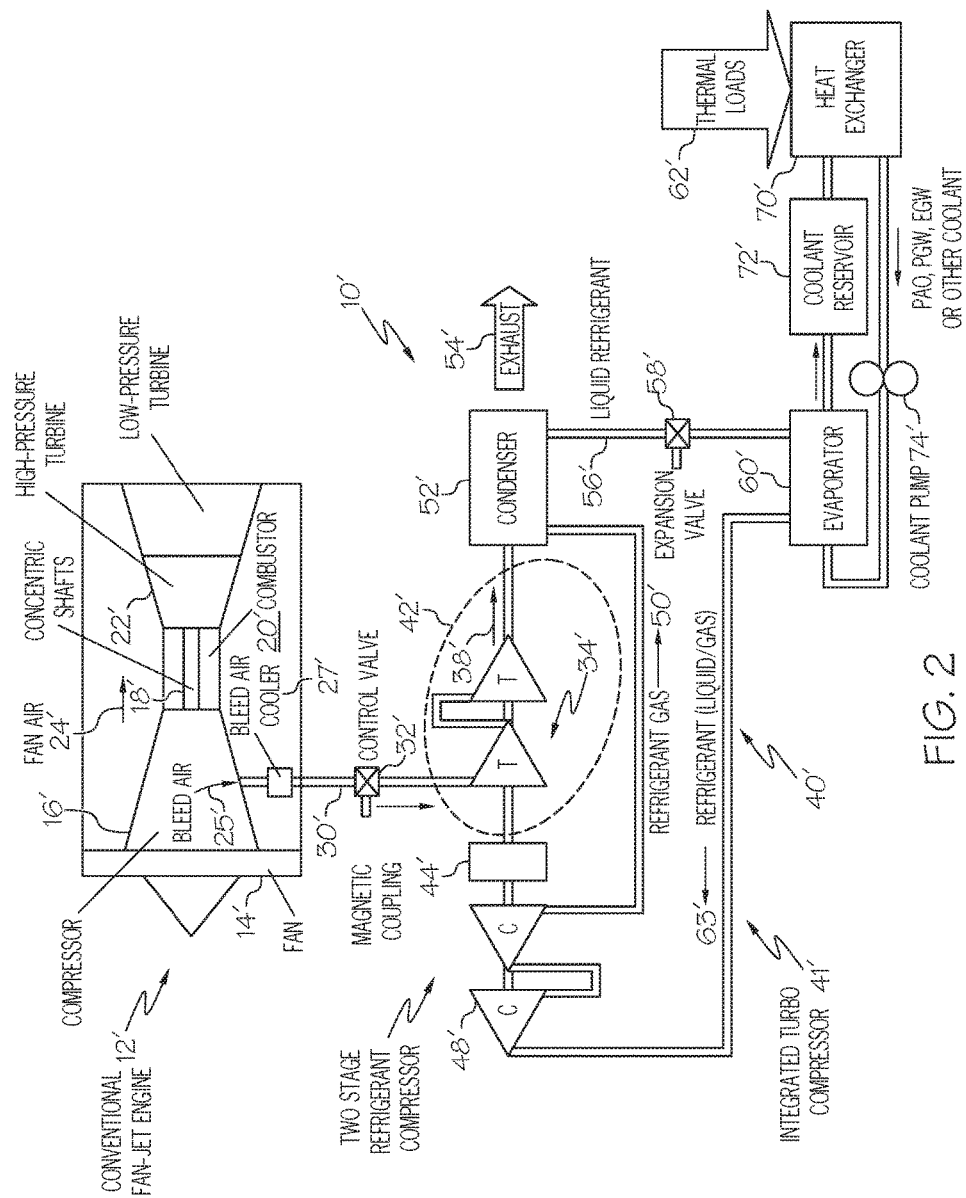
FIG. 2 is a simplified system schematic showing another example embodiment of the cooling system of the present invention.

The temperature at the outlet of the turbine 34 can be cool enough to condense the refrigerant in a condenser 52 under all operating conditions. If 3rd stream air 28 is not available, or if it is not cool enough to provide sufficient cooling, an additional heat sink, for example, ram air, or aircraft fuel, may be utilized. Alternately, or additionally, a higher pressure ratio across the turbine 34, such as might be achieved with a multi-stage turbine 34', as shown in the embodiment of FIG. 2, may be employed.

The turbine 34 of the turbo-compressor can drive the VCS 40 through a shaft with a seal or, as in the embodiment illustrated, the turbine 34 can drive the VCS 40 through a magnetic coupling 44. The magnetic coupling 44 allows the shaft of a VCS refrigerant compressor 48 of the VCS 40 to be hermetically sealed to limit refrigerant leakage and eliminate the need for periodic refrigerant servicing. The magnetic coupling 44 can be replaced with an ordinary shaft seal if the resulting decrease in refrigerant service intervals may be acceptable in the particular environment in which the cooling system 10 may be employed.

The VCS 40 may further include a condenser 52, downstream of the turbine 34, to receive a refrigerant gas 50 from the VCS refrigerant compressor 48 to condense it to a high-pressure liquid refrigerant 56. An expansion valve 58, downstream of the condenser 52, can reduce the pressure of the refrigerant 56. An evaporator 60, downstream of the expansion valve 58, can exchange heat with the fluid/fuel from a chilled fuel tank 64 and a pump 66, which fluid/fuel, after heat exchange, can return to the fuel tank 64. From the evaporator 60, a gas refrigerant 63 can flow to the VCS refrigerant compressor 48.

More particularly, the VCS refrigerant compressor 48 may compress a refrigerant gas 63 and supply that compressed refrigerate gas 50 to the condenser 52. The condenser 52 can remove heat from the refrigerant gas 50 and expel the heat to the turbine discharge 38 generating an exhaust gas 54. The condenser 52 may be cooled by turbine discharge 38, as shown, or other air flows; however, generally, in aircraft embodiments, 3rd stream air may be too hot and ram air scoops increase drag and radar cross-section and may not be available during ground operation. The exhaust gas 54 from the condenser 52 can be fed back into the 3rd stream air 28, if desired (not shown).

Thermal loads 62 may be carried to the evaporator 60 in liquid coolants or gases such as air. However, in the embodiment of FIG. 1, the evaporator 60 can also be used to cool aircraft fuel which can then be stored in a dedicated chilled fuel tank 64. This chilled fuel can then be used to cool the thermal loads 62, other aircraft systems, or the like. The fuel from the chilled fuel tank 64 can be pumped by a fuel pump 66 through the evaporator 60, where it may be cooled and returned to the chilled fuel tank 64.

If and when needed, the fuel in the chilled fuel tank 64 can be directed to the main engine fuel boost pump (not shown) by opening fuel control valve 68. This approach offers the advantage that a relatively large amount of thermal energy can be absorbed and stored. This thermal storage capacity allows the integrated air and vapor cycle cooling system to be sized for average thermal loads over some period of time rather than for maximum peak loads, since the average thermal load may often be much lower than the peak loads, particularly in cases where the heat may be generated by directed energy weapons which do not operate continuously.

Unlike wax-based thermal storage systems or the other cooling fluids, using fuel for thermal storage offers the advantage of also being able to use the fuel for propulsion. Of course, once the chilled fuel is burned in the engine it is no longer available for thermal storage, but as long as all the other fuel on the aircraft is used first, the thermal storage capability can be maintained until near the end of the flight, such as while returning to base after a mission when thermal loads have moderated.

Using chilled fuel provides potentially massive energy storage for extended operation with high thermal loads, or for temporary interruptions in cooling system operation, such as when maximum engine performance may be required (e.g. during take-offs), or in the event of a cooling system failure. In addition, chilled fuel supports steady evaporator temperatures for simplified VCS control, while avoiding added weight and volume of a dedicated thermal storage system. As mentioned, it also can be used for propulsion during egress when thermal loads are reduced.

With reference additionally now to FIG. 2, another example embodiment of the present invention is illustrated, showing at least some possible alternative structures and devices for making and using a cooling system 10', which can be employed in aircraft or other environments. The cooling system 10' in this embodiment may be used in conjunction with a conventional fan-jet engine 12'. The conventional fan-jet engine 12' has an input fan 14' and a compressor 16', which are connected by concentric shafts 18' to a low- and high-pressure turbine sections 22'. The compressor 16' and turbine 22' are fluidically coupled by a combustion chamber 20'.

Bleed air 25' from the conventional fan-jet engine 12' may be directed through a bleed air cooler 27' where it may be cooled by engine fan air 24'. The resulting high-pressure air 30', which may now cooled to a moderate temperature, may be metered through a flow control valve 32' and into a two-stage turbine 34', which may be integrated into a turbo-compressor configuration as described more fully below. The two-stage turbine 34' configuration may be used, for example, to achieve sufficiently cool temperatures in the condenser 52' or to reduce its size.

The flow control valve 32' may be used to adjust the speed of the two-stage turbine 34', as needed, to accommodate variations in thermal loads, for instance, of aircraft, or other environment, in which the cooling system 10' may be installed. The cool discharge air stream 38' of the two-stage turbine 34' provides a cool air stream which may be used as a heat sink for the VCS 40', as described in greater detail below. The combination of bleed air 25' cooled by the engine fan air 24' and expanded across the two-stage turbine 34' to produce a cool discharge air stream 38 forms a simple-cycle ACS 42'.

The two-stage turbine 34' drives the VCS 40' through a magnetic coupling 44'. In the embodiment of FIG. 2, a two-stage VCS refrigerant compressor 48' may be employed in the VCS 40'. The magnetic coupling 44' allows the shaft of the two-stage VCS refrigerant compressor 48' of the VCS 40' to be hermetically sealed to limit refrigerant leakage and eliminate the need for periodic refrigerant servicing.

The two-stage VCS refrigerant compressor 48' of the VCS 40' compresses a refrigerant gas 50' and directs it to a condenser 52'. The condenser 52' removes heat from the refrigerant gas 50' and expels the heat to the turbine discharge air stream, generating the exhaust gas 54'. The condenser 52' may be cooled by the cool turbine discharge air stream 38', as shown. The condenser 52' condenses the refrigerant gas 50' into a high-pressure liquid refrigerant 56'. The pressure of the refrigerant 56' may be then reduced across an adjustable expansion valve 58' and directed into an evaporator 60' where it can absorb heat from thermal loads 62', for example, from an aircraft (not shown) in which the system may be installed. The output from the evaporator 60' may be returned to the two-stage VCS refrigerant compressor 48' in liquid/gas form 63' to complete the cycle. This combination of two-stage VCS refrigerant compressor 48', condenser 52', adjustable expansion valve 58', and evaporator 60' comprise the VCS 40'.

In the embodiment of FIG. 2, the thermal loads 62' are cooled in a heat exchanger 70' through which coolant from a coolant reservoir 72' may be circulated. The coolant may be pumped through the evaporator 60', coolant reservoir 72', and heat exchanger 70' by a coolant pump 74', as shown. Suitable liquid coolants might include polyalphaolephin (PAO), water, or water mixtures such as ethylene glycol and water (EGW) or propylene glycol and water (PGW). These liquids could be used, for example, to cool high-power aircraft electronics including directed energy weapons, engine components, and actuators. Gases such as air would might be air used to cool avionics and for cockpit cooling and pressurization.

The various design option embodiments described above are not intended to be exhaustive or complete as other design options will be apparent to those skilled in the art. For example, the air stream provided to the turbine 34 of the turbo-compressor in FIG. 1 or two-stage turbine 34' in FIG. 2 may be derived from fan air, engine bleed air, $3^{rd}$ stream air, or another air source. The cooling medium used in the heat exchanger 26 in FIG. 1 or the bleed air cooler 27' in FIG. 2 may be provided by fan air, $3^{rd}$ stream air, ram air, fuel, or another cooling source.

It should be understood, of course, that the foregoing relates to exemplary embodiments of the invention and that modifications may be made without departing from the spirit and scope of the invention as set forth in the following claims.

We claim:

1. A cooling system, comprising:
   an air cycle system (ACS) comprising a two-stage turbine driven by air from a turbo-fan engine;
   a vapor cycle system (VCS) comprising an evaporator, a two-stage compressor driven by the turbine, and a condenser cooled by discharge from the turbine;
   wherein the evaporator receives a liquid refrigerant from the condenser;
   wherein the condenser receives a gas refrigerant from a second stage of the compressor;
   wherein a first stage of the compressor receives a liquid/gas refrigerant from the evaporator;
   a liquid coolant reservoir directly downstream of the evaporator;
   a heat exchanger directly downstream of the liquid coolant reservoir;
   wherein the heat exchanger is upstream of the evaporator with only a coolant pump and ducting between the heat exchanger and the evaporator;
   wherein the heat exchanger receives a thermal load from outside of the cooling system; and
   wherein liquid coolant from the from the heat exchanger is re-circulated back through the evaporator and then through the liquid coolant reservoir.

2. The cooling system of claim 1 further comprising:
   an expansion valve between the condenser and the evaporator.

3. The cooling system of claim 1 further comprising a magnetic coupling between the turbine and the compressor.

4. The cooling system of claim 1 wherein the liquid coolant is engine fuel.

5. The cooling system of claim 1 wherein the liquid coolant is selected from the group consisting of polyalphaolephin (PAO), water, or water mixtures such as ethylene glycol and water (EGW) or propylene glycol and water (PGW).

6. The cooling system of claim 1 wherein the thermal load is selected from the group consisting of air for cockpit cooling, aircraft electronics loads, aircraft avionics, and directed energy weapons.

7. The cooling system of claim 1, wherein the air from the turbo-fan engine is provided by a third stream air.

8. The cooling system of claim 1 further comprising a control valve between the turbo-fan engine and the turbine to control an air flow to the turbine for adjusting a speed of the turbine as needed according to variations in aircraft thermal loads.

9. A cooling system, comprising:
   an air cycle system (ACS) comprising a two-stage turbine driven by air from an engine;
   wherein a first stage of the turbine receives the engine air;
   a vapor cycle system (VCS) comprising a two-stage compressor driven by the turbine, a condenser cooled by a second stage turbine discharge, and an evaporator;
   wherein the two-stage turbine drives a second stage of the compressor and also drives, via the second stage of the compressor, a first stage of the compressor;
   wherein the first stage of the compressor receives a discharge from the evaporator;

a magnetic coupling directly between the first stage of the turbine and the second stage of the compressor;

wherein there is an absence of system components between the first stage of the turbine and the second stage of the compressor other than a shaft with a magnetic coupling; and wherein the condenser receives a discharge flow directly from the second stage of the compressor and receives a discharge flow directly from a cooling stage of the turbine.

10. The cooling system of claim 9 wherein the magnetic coupling hermetically isolates the refrigerant compressor.

11. The cooling system of claim 9 wherein the engine is a variable cycle engine.

12. The cooling system of claim 9 wherein the engine is a turbo-fan engine.

13. The cooling system of claim 9 further comprising a control valve between the turbo-fan engine and the turbine to control an air flow to the turbine for adjusting a speed of the turbine according to variations in aircraft thermal loads.

* * * * *